(12) United States Patent
Gray et al.

(10) Patent No.: US 6,249,887 B1
(45) Date of Patent: Jun. 19, 2001

(54) APPARATUS AND METHOD FOR PREDICTING FAILURE OF A DISK DRIVE

(75) Inventors: William F. Gray, Melbourne Beach, FL (US); Ralf Brown, Pittsburg, PA (US)

(73) Assignee: William G. Gray, Melbourne Beach, FL (US)

( * ) Notice: Subject to any disclaimer, the term of this patent is extended or adjusted under 35 U.S.C. 154(b) by 0 days.

(21) Appl. No.: 09/157,382

(22) Filed: Sep. 21, 1998

(51) Int. Cl.[7] .................................................. H20H 3/05
(52) U.S. Cl. ................................ 714/47; 714/44; 714/48; 714/700
(58) Field of Search .................... 714/47, 41, 42, 714/43, 44, 48, 56, 57, 700, 715, 744

(56) References Cited

U.S. PATENT DOCUMENTS

| | | | |
|---|---|---|---|
| 4,103,338 | 7/1978 | Cizmic et al. | 364/900 |
| 4,268,905 | 5/1981 | Johann et al. | 364/200 |
| 4,348,761 | 9/1982 | Berger | 71/21 |
| 4,623,942 | 11/1986 | Kraus et al. | 360/75 |
| 4,904,938 | 2/1990 | O'Reilly et al. | 324/212 |
| 4,949,036 | 8/1990 | Bezinque et al. | 324/212 |
| 4,979,055 | 12/1990 | Squires et al. | 360/69 |
| 5,068,851 | 11/1991 | Bruckert et al. | 371/16.1 |
| 5,109,304 | 4/1992 | Pederson | 360/51 |
| 5,157,781 | 10/1992 | Harwood et al. | 395/575 |
| 5,185,881 | 2/1993 | Brooks et al. | 395/575 |
| 5,237,551 | 8/1993 | Ogawa et al. | 369/54 |
| 5,257,255 | 10/1993 | Morimoto et al. | 369/53 |
| 5,355,121 | 10/1994 | Naito et al. | 340/584 |
| 5,422,890 | 6/1995 | Klingsporn et al. | 371/21.6 |
| 5,479,651 | 12/1995 | Nakaguchi | 395/182.03 |
| 5,539,270 | 7/1996 | Kaji et al. | 310/329 |
| 5,557,183 | 9/1996 | Bates et al. | 318/434 |
| 5,661,615 | 8/1997 | Waugh et al. | 360/75 |

*Primary Examiner*—Norman Wright
(74) *Attorney, Agent, or Firm*—Cahn & Samuels, LLP (57) ABSTRACT

A system for predicting failure of a disk is provided. A test string of performance sensitive reads is built and calibrated. That is, the positioning time and spindle speed for each performance sensitive read is logged. The test string is then applied to a disk and the positioning time and spindle speed for each performance sensitive read, as applied, is measured. The calibrated positioning times and spindle speeds are then compared with the measured positioning times and spindle speeds. The comparison result is used as a reliable predictor for disk failure.

51 Claims, 9 Drawing Sheets

BUILDING DUAL ACCESS READ(DAR) INVENTORY FOR "CREEP" AND "SWEEP" ACCESS PATTERNS

FIG. 1

DISK DRIVE OVERVIEW &COMPUTER INTERFACE

FIG. 2
DUAL ACCESS READ-NO LATENCY

FIG. 3
AMPLIFYING POSITIONING VARIANCE-MEASURE REVOLUTION TIME

CASE 1 POSITIONING<ROTATION

CASE 2 POSITIONING>ROTATION

FIG. 4
BUILDING DUAL ACCESS READ(DAR) INVENTORY
FOR "CREEP" AND "SWEEP" ACCESS PATTERNS

FIG. 5

GENERATING AND CALIBRATING READ TEST STRINGS

FIG. 6

TEST DATA ACQUISITION

FIG. 7
TEST ANALYSIS AND FAULT SOLUTIONS

FIG. 8

PROBABILITY OF 10-DAR MEASUREMENT
READ CALIBRATION: 58% FAST, 42% SLOW

The probability sum of the 11 possible outcomes is 100%

FIG. 9
DIAGNOSTIC DRIVE RELIABILITY TRENDS

APPARATUS AND METHOD FOR PREDICTING FAILURE OF A DISK DRIVE

FIELD OF THE INVENTION

This invention relates to the field of data storage using magnetic disk drives, for example, magnetic disk drive data storage. More specifically, the invention pertains to the field of predicting failure of a disk drive by monitoring a test string of performance sensitive read operations.

BACKGROUND OF THE INVENTION

Personal computers (PC's) have become increasingly more powerful during recent years and are utilized for a variety of applications in industry, business and education. The varied uses result in different requirements for various subsystems that form the PC. As applications become more complex, the storage requirements for PC's increase. Thus, it is now common for PC's to include hard disks having a storage capacity of as much as 16.8 gigabytes and capacities continue to increase.

Information is stored on the disks in a plurality of concentric circular tracks by an array of transducers, or heads (usually one per disk surface) mounted for movement to an electronically controlled actuator mechanism. The storing of information on the disks is sometimes also referred to as "writing", and the subsequent retrieval of information from the disks is also called "reading".

Over time, hard disks tend to develop a number of defects. Some defects are attributable to user manageable causes such as radiation, temperature, moisture, pressure, impact and vibration. Other defects are attributable to mechanical failure of one or more components of the disk drive assembly such as the spindle, the arm and other mechanical components.

Currently, there are computer programs for testing computer peripheral storage media, particularly rotating magnetic storage media, to determine whether there are areas that are bad or marginal with respect to storing data with integrity. Many of these programs accomplish the task by writing and reading areas of a storage medium repeatedly to determine the reliability of these areas. If an area does not meet some selected threshold of reliability, then the area is marked bad and data is relocated if possible. These programs are designed to test the disk drive prior to sale of the disk drive and/or prior to incorporating the disk drive into the computer system. These programs tend to be customized for a particular make and model of disk and are not typically generically applicable.

U.S. Pat. No. 5,422,890 discloses a system and method that captures and characterizes error information during disk tests. The system is capable of dynamically determining whether the disk under test has exceeded acceptable error rates based on an actual number of bytes read. The system saves error log information, including specific sector addresses, error rates, error types and data patterns.

Other software-only monitors are known. However, they are limited to timing signals between a host microprocessor and the drive controller. These signals are predominantly sensitive to variations of disk rotation speed which, because of their high regulation, do not furnish any practical early warning of trouble. When the disk spindle has serious bearing wear or lack of lubricant, the drive controller increases power to overcome the resultant mechanical grinding. As a result, disk failure is hastened in a manner that is not readily detectable.

In the manufacture of disk drives, it is not unusual for tens of thousands of disk drive units to be fabricated daily. With such high numbers of disk drives being made, it is apparent that a certain number of units will fail to meet the design specifications, due to faulty components, improper assembly, contamination, and other elements familiar to those of skill in the art. While every effort is made by disk drive manufacturers to minimize these defective units and assembly errors, a small percentage of defective units will inevitably be built. When the defect is introduced into the unit at an early stage in the manufacturing process, the fault may not be detected until a much later stage of the process. Such a delay in the detection of defective assemblies can result in a significant amount of labor costs when taken over the large numbers of units being manufactured.

U.S. Pat. No. 5,557,193 discloses a method and apparatus for predicting failure of a disk drive based upon electrical power consumption. This system is capable of determining when a disk drive may fail and entrap the stored data. Like other patents that detect dynamic anomalies as opposed to media failures, it requires new hardware and embedded code added to the disk drive during the manufacturing process (at the factory).

Another example of the "factory-installed" approach to disk drive failure prediction is the S.M.A.R.T. (Self-Monitoring Analysis and Reporting Technology) technology. This is a voluntary standard covering sensing and reporting of hard drive dynamic performance. It is a combination of Compaq's Intellisafe and IBMs Predictive Failure Analysis (PFA). One of the drawbacks to S.M.A.R.T. is that special, customized hardware is needed to allow users to effectively employ S.M.A.R.T.

Declining disk drive costs reduce the need for sophisticated evidence before making a disk drive replacement decision. When S.M.A.R.T. was originally conceived, disk drive storage was relatively expensive and a decision to replace a suspect disk drive required detailed evidence of potential failure. The cost of disk drive storage has dramatically fallen, from $0.92 a megabyte in 1993 to about $0.09 a megabyte in 1998 and is expected to drop even further in the future due at least in part to increased competition in the market place.

The forgoing known methods of predicting disk drive failure using factory installed components are disadvantageous for a number or reasons. First, there is a high cost of operation. The drive assemblies require additional hardware, which necessarily increases drive costs at a time when the drive industry is suffering strong price erosion due to vigorous competition. Second, the factory installed approach has limited application. Drives already shipped cannot be tested without a return trip to the factory. Thus, absent an industry wide agreement, competitive drives cannot be monitored against each other. Third, there is an increased risk of error due to the possibility of failure of the additional hardware. Fourth, the factory installed systems are difficult to maintain because if there is a sensor or other hardware problem, the drive must be sent back to the factory.

Accordingly, there is a need for a generic disk failure prediction system that overcomes the above mentioned problems and provides a reliable indication of the state of the disk and alerts appropriate personnel when the disk becomes faulty.

SUMMARY OF THE INVENTION

This invention predicts and diagnoses the future failure of a computer's disk drives due to deficiencies in the disk drives' mechanical systems, namely, the spindle drive, the actuator arm and the internal environment in which they operate. An increase in one or more of these deficiencies, typically a result of manufacturing defects, poor operating environment and/or excessive wear, is used to predict drive failure and to recommend corrective user action. This invention may be realized by downloading software from a remote computer to virtually any on-line PC. Alternatively, the invention may be realized by directly programming a local computer (PC) by, e.g., loading software from a readable medium such as a floppy disk or CD ROM or by providing the computer with a pre programmed chip.

State-of-the-art disk drives that incorporate systems for the early warning of mechanical and environmentally caused failure typically require special factory-installed hardware and/or drive controller logic code. This limits their applicability and maintenance and adds to disk drive production and service costs. Past efforts to develop generic down loaded solutions, such as this invention, have been unsuccessful primarily because the operational signals necessary to accurately detect most operating deficiencies before they cause a drive failure are restricted to the disk drive processor and are not available to the computer CPU or the computer user.

A feature of this invention is that it synthesizes internal, fault-sensitive, disk drive signals at the computer CPU level enabling prediction and diagnosis of the future cause of failure without the need for special factory installed hardware or code and in a form that can be efficiently installed by downloading software to virtually any networked PC. It predicts future failure of a disk drive by analyzing the disk's ability to execute performance sensitive read operations consistently over time. More particularly the invention creates a test string of reads for a disk, preferably when the disk is new. Each test read, known as a dual access read or DAR, has two possible read times under fault-free conditions, one a single revolution time shorter than the other. These read times are respectively designated as fast and slow. The CPU-available read times for fast and slow possibilities, the resulting revolution time calculated by subtracting the two read times, and the ratio between fast and slow possibilities are recorded from multiple DAR repetitions and saved as input for a test read calibration.

Still another feature of this invention is that it synthesizes the fault-sensitive actuator arm positioning time, which is unavailable to the CPU without special hardware, by selecting DARs where the CPU- available read start interrupt to data transfer start interrupt time is approximately equal to the desired positioning time. This occurs when the traverse time of the actuator arm to reach the next read record is the same as the disk rotation time to bring the record to the read/write head. This invention identifies such test reads when multiple DAR repetitions yield an equivalent amount of fast and slow read times.

In accordance with an aspect of the invention, when preparing a string of test reads, a probability of occurrence of a particular ratio between fast and slow repetitions of each test read may be calculated as a no-fault calibration. The use of this binary-based probability forms a common datum for different test reads and allows new test reads to be substituted without affecting the invention's calculated results. Subsequently, when the test reads are executed during a test, their probability of occurrence is calculated and compared to the probabilities of the calibration. The degree of variance between the calibration and test probabilities is directly proportional to the degree of risk that the drive will fail.

The invention's use of probability allows the replacement of test reads that produce erroneous results caused by fault-free but transient operation of PC subsystems without compromising the statistical history of the drive. The two calibrated read times, fast and slow, are used to identify and replace very short test reads that are caused by the intermittent effect of cache or memory-to-memory read accesses. Test reads involving test sectors relocated by disk media maintenance routines and the like are similarly identified and replaced. When an anomalous RPM time is detected during the calibration of a DAR, the DAR is replaced. When an anomalous RPM time is detected during test it is logged as a spindle alarm and overrides any access arm or environmental alarms that might happen during the same time as a result of the anomalous rotation.

Test reads preferably include different actuator traverse patterns to detect and diagnose the difference between probable failures caused by the deficiencies in the actuator arm mechanical system and those caused by a defective internal atmospheric environment in which the actuator and read/write head operate. Short traverses known as creeps emphasize the effects of actuator arm mechanical faults and de-emphasize environmental faults. Long traverses known as sweeps do the reverse and emphasize environmental faults while de-emphasizing mechanical faults.

Verification that the invention is installed and working on a computer may be conveniently obtained by tilting the computer on its side and generating an alarm. This tilt test detects the effects of different gravitational forces of the actuator arm.

An advantage of this invention is that disk drive warranty providers can use it to provide replace-before-failure warrantees, an upgrade of their present replace-after-failure (and loss of user data) warrantees. This invention also reminds PC users when their disk drive should be replaced and presents the users with corrective options which may be conveniently investigated and ordered over the network.

DETAILED DESCRIPTION OF THE DRAWINGS

This invention pertains to a typical computer that, without hardware or operating system modification, can track the reliability of each of the computer's disk drives for the purpose of predicting disk drive failure. More specifically, this invention monitors and diagnoses the performance of disk drive mechanical systems, e.g., the spindle and the actuator arm drive and monitors the quality of the environment in which they interact. This invention synthesizes, at the computer CPU level, the actuator arm positioning time and disk revolutions per second. These fault-sensitive functions are available at the disk drives' internal processor level and are not available to the computer CPU. In state-of-the-art disk drive failure prediction systems this information is typically transmitted to the computer CPU level with the addition of special hardware and micro code. This invention's process of synthesizing the finite internal disk performance from the gross start-stop interrupt signals available to the computer CPU enables it to be remotely installed and maintained by simply down loading software to virtually any on-line microprocessor-driven computer.

Figure 1:
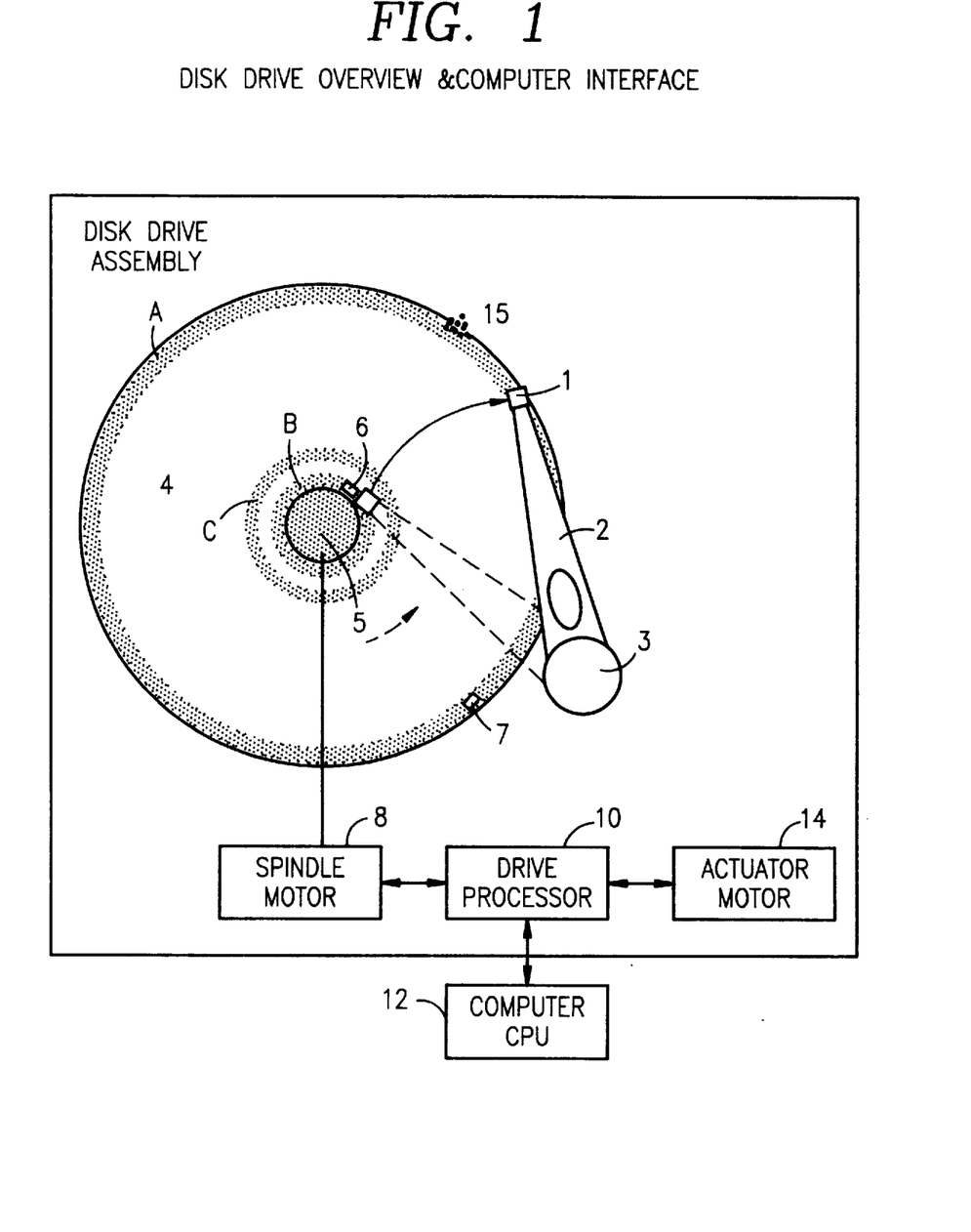
FIG. 1 is a top view of a disk drive assembly incorporating the invention.

It is an object of this invention to detect minuscule operating variances indicative of future drive failure in the fault-sensitive synchronization between the rotating disk and the traversing actuator arm. This invention effectively amplifies the measurable effect of these minuscule variances by selecting test reads which due to these minuscule variances will add or delete a 360 degree disk revolution to the read time. FIG. 1 is a simplified top view of a disk drive assembly and its interface with the computer CPU. The read/write heads or transducers 1 are mounted at the end of an actuator arm 2. The heads 1 are traversed to the desired disk track A by selective control of an actuator motor 14. The disks 4 are conventionally mounted on a spindle 5 which is rotated, typically counterclockwise, by the spindle motor 8. A disk drive processor 10, using a feed back process, controls the spindle 5 to a near-constant speed generally within +0.1% or −0.1% of rated speed that is typically from 3600–10000 RPM. The spindle 5 usually supports a number of disks 4 in a stack wherein all similar numbered tracks lie generally in alignment in what is called a cylinder. Data on a track is arranged in sectors typically containing 512 data bytes. This invention may be implemented in computers having disk drives with multiple disks 4 and computers with multiple disk drives.

In a typical read operation, such as reading sector 7 on track A after reading sector 6 on track B, the computer CPU 12 issues a read command to the disk drive processor 10. The disk drive processor 10 informs the actuator motor 14 to traverse the arm from track B shown as a dotted line arm to track A after the reading of sector 6. The positioning time, FIG. 2, includes the time from the CPU 12 read interrupt command to when the read/write head 1 is properly positioned and in a read-ready state over track A. Typically there is no signal at the conclusion of the positioning time from the disk drive processor 10 to the computer CPU 12. The properly positioned read/write head 1 then waits over track B for the spindle motor 8 to rotate sector 7 under it. This waiting period, which is terminated by the beginning of reading sector 7, is known as rotational latency. The drive processor then informs the computer CPU 12 when the data starts transferring from the disk surface to the read head 1 via an interrupt signal. The computer CPU 12 uses this interrupt signal to deallocate itself from the disk reading process and to continue the processing tasks it served before the read request.

Figure 2:
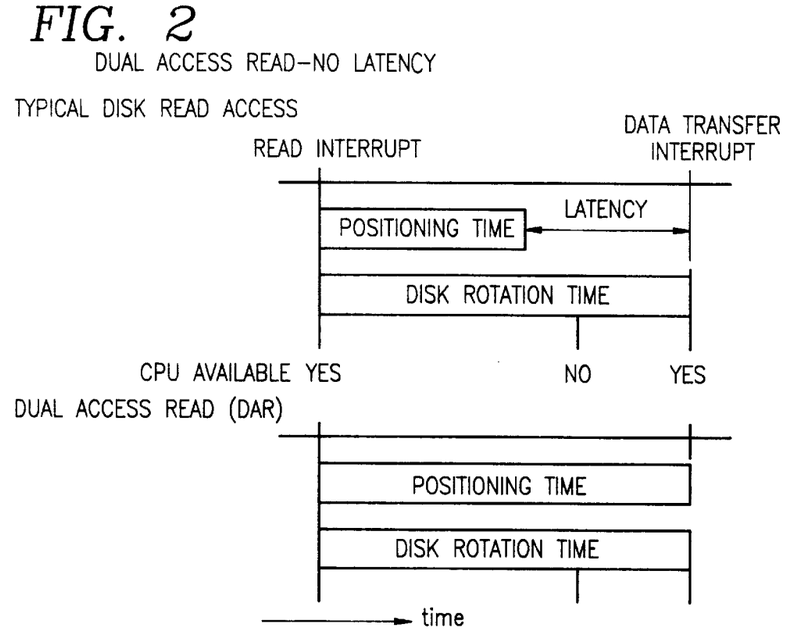
FIG. 2 is a diagram showing the relationship between positioning time, rotational latency and disk rotation time in a typical disk read operation.

Unfortunately this data transfer start interrupt and the disk rotation time it helps define, FIG. 2, is not normally affected by conditions that will eventually cause a failure. This is because the spindle motor 8 is closely controlled by the drive processor to provide a constant rotational speed. The effects of worn spindle bearings, lack of spindle lubricant, and other causes of spindle failure are masked in part by the constant speed control function which typically increases spindle motor 8 power to overcome the resulting friction and maintain constant RPM.

In contrast, the positioning time, FIG. 2, while unavailable to the computer CPU 12, is highly sensitive to the early effects of failure causing conditions. This is primarily due to what those skilled in the art call the settling in period which concludes the positioning time. The settle in period is the time to stabilize the read head 1, once the actuator arm 2 has arrived properly over the read track, e.g., track A, in a read ready position. Settle times are increased by exposure to a degraded internal environment, defective functioning of the actuator system and/or defective functioning of the spindle 5. When the actuator arm 2 and head 1 are accelerated during the track to track traverse by the actuator motor 14 when leaving track B and then decelerated shortly before arriving at track A, the actuator arm 2 and the head 1 tend to oscillate making initial reading problematical. Once this oscillation has been dampened and the head 1 has settled, reading of track data can begin and the positioning time concludes.

Figure 3:
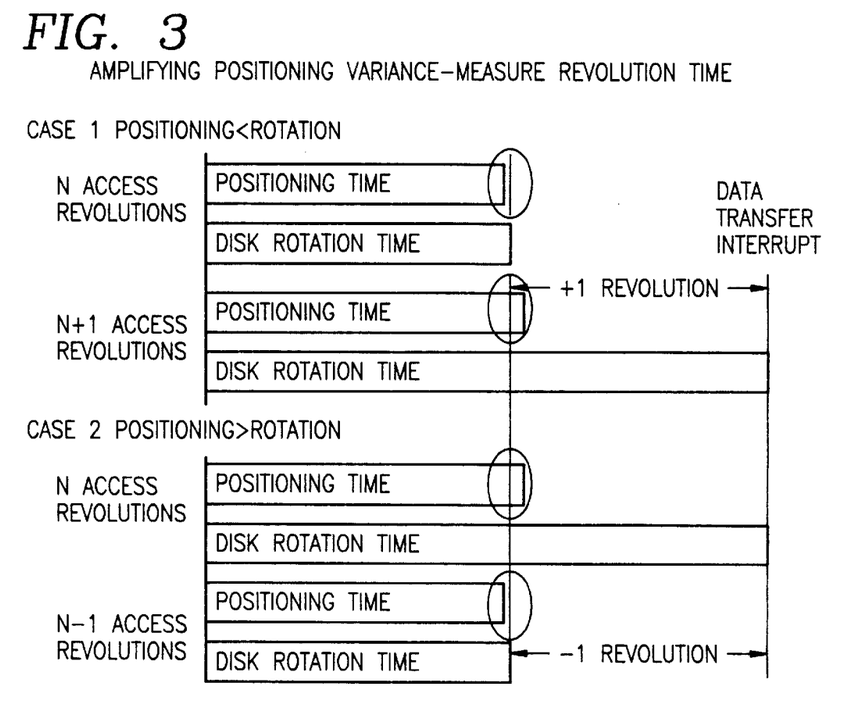
FIG. 3 is a diagram showing the relationship between positioning time for dual access reads and disk rotation time.

In accordance with the invention, the positioning time known only to the drive processor in computers may be synthesized without extra hardware by selecting test reads that have no or little latency time thus making the CPU available rotation time equivalent to the positioning time as illustrated in FIG. 2. This is accomplished by initially screening test read candidates that under no-fault conditions, given a statistically significant number of trials, require two different read times respectively referred to as fast and slow. Slow read times require one more disk revolution to complete than fast reads. Normally an A to B read has only one no-fault read time. The dual time syndrome occurs when the positioning time and the disk rotation time are near equal and the read head 1 is equally likely to start reading either before or after the start of the read sector. As described in FIG. 3, when the positioning is slightly faster than the rotation time a fast read is achieved as in Case 1 and when the positioning time is slightly slower than the rotation an extra revolution is required to complete the read yielding a slow read as in case 2. This scenario also works in reverse. When the positioning time is slightly longer than the rotation time a latency of 1 revolution occurs. When the positioning time decreases to less than the disk rotation time the read is accomplished in one revolution less.

These test reads are termed in this invention as dual access reads (DAR) and are selected when they generate a near equal amount of fast and slows during calibration. A near balance such as a mix of 480 fast and 520 slow indicates that on average the latency is nil. Each DAR has two acceptable read times, N and either N+1 or N−1 revolutions (FIG. 3) which are measured by the computer CPU 12. Any other time indicates an exception and the read is preferably replaced as described later. Experience has shown that approximately 1 in 50,000 possible A to B test reads is a suitable DAR with a near balanced ratio between fast and slow reads. For comparison a 4 GB drive contains approximately $8 \times 10^6$ sectors and $64 \times 10^{12}$ (($8 \times 10^6)^2$ for all disks and read heads) possible A to B reads. This produces $1 \times 10^9$ DAR candidates that are suitable for test strings.

A feature of this invention is that it reduces sophisticated measurements to two possible binary outcomes of fast and slow DAR reads. These simple tests are repeated and the sum of the results such as 4 fast and 6 slow are quantified as a probability using what is known in statistics as a Bernoulli trial. The use of probability allows one quantity to accurately represent many repetitions of the binary fast-slow read test. It also allows a commonality among many test reads. A test read from A to B may be replaced with a test read from C to D involving different times without jeopardizing the continuity of the test results. Reads in a test string that have to be replaced when they are rendered obsolete due, for example, to a physical relocation of a sector can be replaced along with their corresponding calibration information even though they have a different fast slow ratio without distorting the reliability trends. In a similar manner, complete test strings and their calibration information may be replaced.

Figure 8:
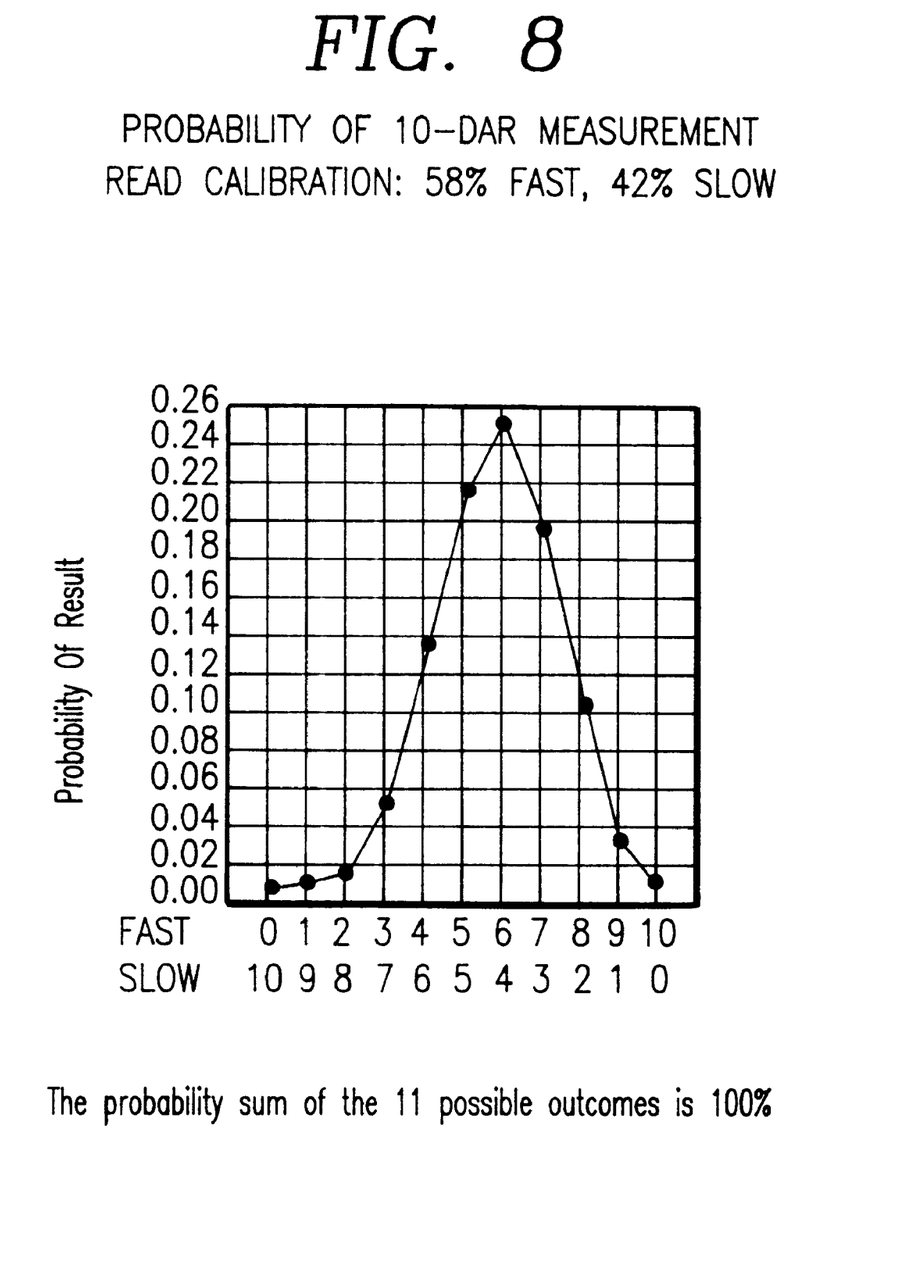
FIG. 8 is a graph of the possible fast and slow read combinations vs. the probability of their occurrence.

The Bernoulli trial provides the statistical probability for events involving only two possible outcomes. An example, penny flipping, provides only two outcomes, heads and tails, and by trial we know that on average 50% of the outcomes will be heads and 50% will be tails. Bernoulli teaches that if you flip a penny 10 times the odds of 5 heads and 5 tails are about 25%, the odds of 6 heads and 4 tails or 6 tails and 4 heads are about 20% and so on. In this invention, the fast and slow alternatives are not as a rule evenly balanced between alternatives as heads and tails. FIG. 8 shows an actual distribution for a probability for a DAR having a 58% fast and 42% slow mix during calibration. In this case the probability of 5 fast and 5 slow test reads is about 22% and the probability of 6 fast and 4 slow is about 25%.

Irrespective of the DAR probability, two basic patterns of actuator movement may be employed to diagnose between faults caused by actuator mechanical problems and those caused by the environment. One pattern shown in FIG. 1, A to B, involves a large spindle to outer edge traverse known as a sweep. This exposes the read head 1 to more of the internal environment surrounding the disk surface including particles of moisture and eroded recording material 15. Anomalies are more likely to be caused by adverse environmental conditions. Short traverse patterns such as B to C are more mechanically intense and less subject to the environment. Their performance is more indicative of mechanical degradation of actuator arm 2.

Under no-fault conditions, test read times can be corrupted by normal but transient events including RPM variations, data relocation of the disk and cache or memory-to-memory reads. Because stable disk RPM are important to this invention, all readings involving disk RPMs that are outside of the normal range are preferably edited out of the test through an authentication process. After RPM authentication, DARs that produce deviant but constant results may be deleted and replaced. In addition, DARs that have minute read time on a transient or permanent basis, e.g., faster than any track to track read, as can occur when cache access is applied by the disk drive may be edited out and replaced if the cashing continues.

In accordance with an advantageous feature of the invention, a "tip test" may be performed to verify accurate detection of the early signs of disk drive failure. In practicing the tip test, a computer programmed in accordance with the invention, may be tipped on it's side prior to executing the test. The effect of gravity in many cases will alter the performance of the positioning time even on new computers. Returning the computer to its upright position will in most cases restore the no-fault condition.

Calibration

Figure 4:
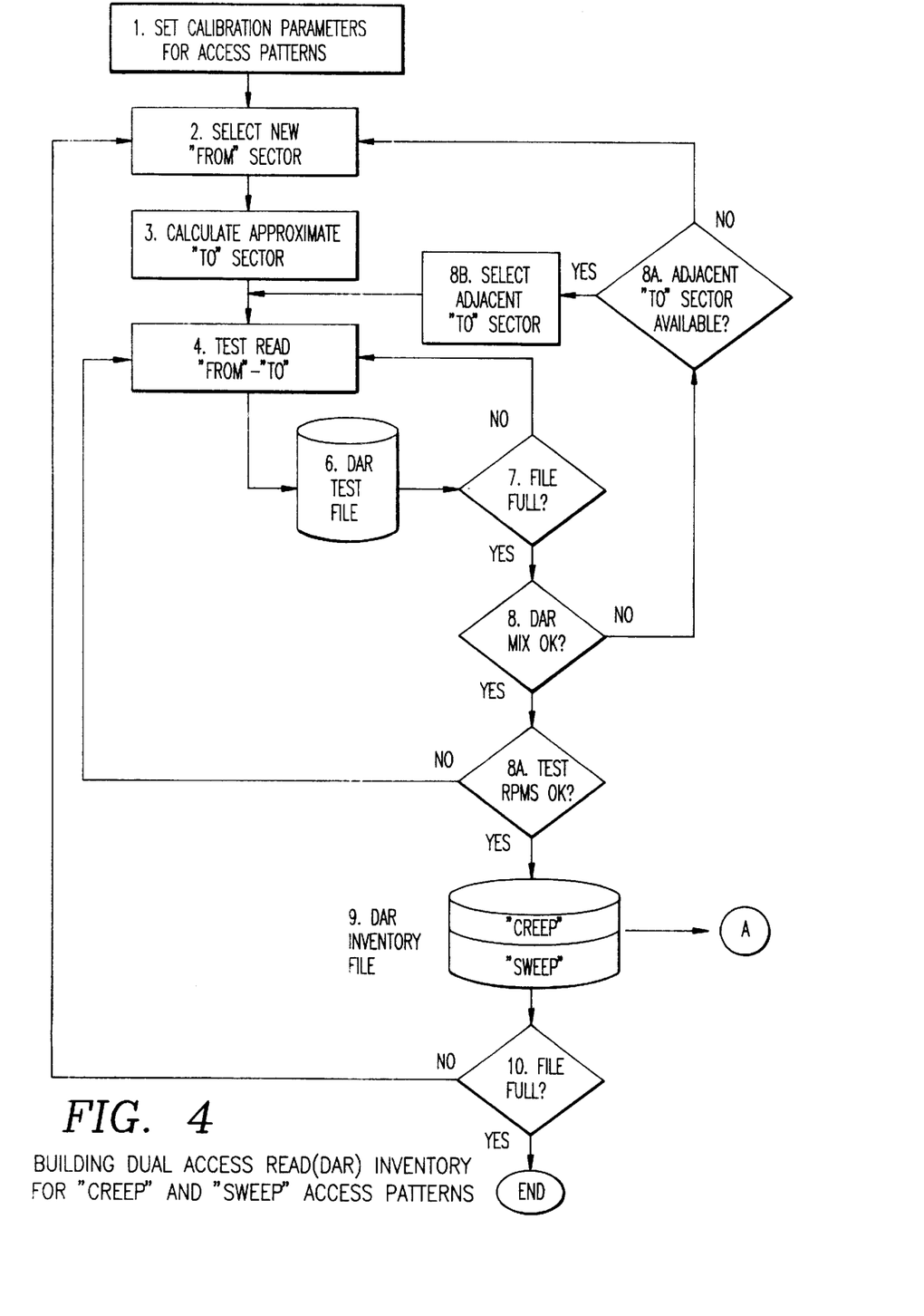
FIG. 4 is a flow chart illustrating a process in accordance with the invention wherein dual access reads are identified and stored.

Every disk drive design involving modifications in track or sector location, standard spindle drive performance and/ or standard access arm performance is calibrated once by identifying all available DAR that fit the sweep and creep access patterns as described in FIG. 4. To avoid a prolonged search for eligible DARs a theoretical DAR is computed using design characteristics. If the DARs are not sufficiently balanced between fast and slow reads, a new "to" sector adjacent to the old one is selected. This has the effect of making slight modifications in the rotation and positioning time which may bring both closer to equality and produce a more even fast-slow balance. In step 1 constants defining sweep and creep patterns including range of tracks to be traversed, acceptable spindle RPM ranges, range of acceptable DAR fast and slow read ratios which are representative of positioning time (FIG. 2) and basic disk design parameters including the speed performance of the spindle 5 and actuator arm 2. The process starts with the selection of a "from" sector; in step 2, the "A" in previously stated A to B read, and uses the design parameters to compute probable sweep and creep "to" sectors where the disk rotation time closely approaches the disk positioning time as described in connection with the DAR of FIG. 2. Each selected read is repeated to determine if the fast and slow ratio is acceptable in steps 4 to 8. More particularly, the selected DARs may be stored in a DAR test file in step 6. When the DAR test file accumulates a prescribed number of test reads, it is considered full, step 7. The DAR revolution mix is then checked in step 8. If the mix is acceptable, e.g., between 40% and 60% N revolutions and between 40% and 60% N±1, then the test read is stored in a DAR inventory file as either a creep or a sweep. If the ratio is unacceptable alternate sectors adjacent to the original sector and its track are attempted in step 8A. If the adjacent sector is available, then it is selected as the new destination sector and the procedure is repeated from step 4. If the adjacent sector is not available, then the procedure reverts back to step 2. Additionally the reads are checked for acceptable RPM and those reads falling outside the constant speed range are replaced with new reads in a return to step 4. The sweep and creep DAR with acceptable fast and slow ratios measured during normal spindle RPM are stored in a DAR inventory file in step 9. It is desirable to store a sufficient number of DARs to allow for ready replacement of old DARs that have become corrupt over the useful life of the disk. Preferably, the DAR inventory file includes a maximum of about 300 creeps and about 300 sweeps. However, the capacity of the DAR inventory file may be adjusted as system requirements dictate. Test reads are preferably executed until the DAR inventory file is full.

Figure 5:
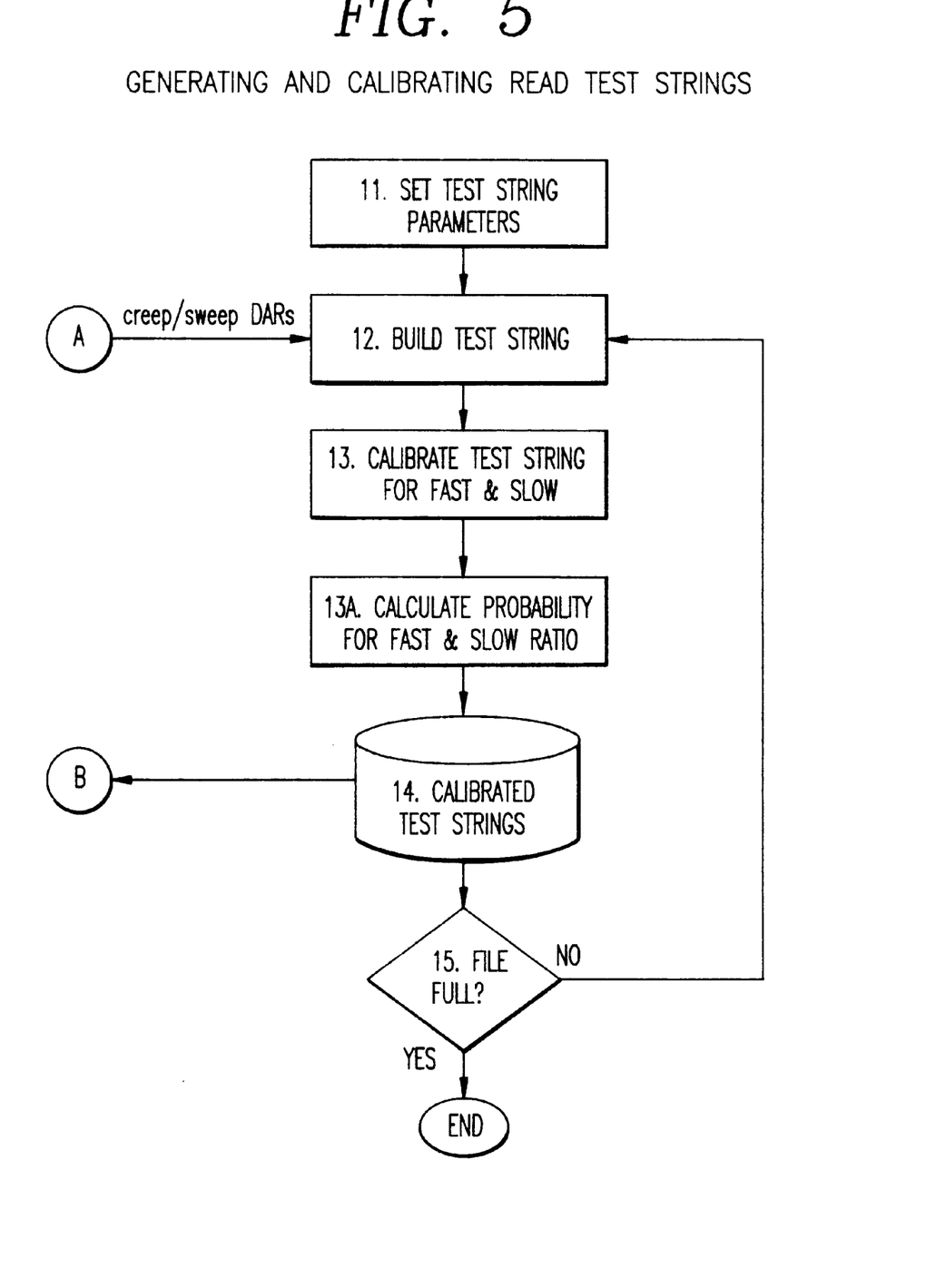
FIG. 5 is a flow chart depicting a procedure for building and calibrating test strings in accordance with the invention.

Once the DARs have been identified and saved, the test string may be built. FIG. 5 depicts a preferred procedure for building the test string. In step 11 the test string parameters are set. Preferably, the test string includes a half string of sweeps and a half string of creeps to permit a probable diagnosis of environmentally caused faults and mechanically caused faults. Some environmentally caused faults can be corrected by the user. Mechanical faults suggest file backup is prudent and eventually require disk drive replacement. To assure that the DARs are true "mechanical reads" and not cache accesses, filler reads may be inserted between the DARs, in accordance with the parameters set in step 11, to occupy any available cache and free the next DAR for a mechanical read. In the preferred embodiment, the test string includes about 8 creeps and 8 sweeps and about 16 fillers for a total of about 32 reads.

In accordance with an aspect of the invention, CPU 12 selects sweeps and creeps from the DAR inventory file (see step 9 of FIG. 4) and assembles the sweep and creeps according to the above mentioned parameters (step 12). The test string may then be calibrated (step 13). Preferably, the test string is calibrated by executing the DARs a plurality of times, e.g., 1000 times, and identifying and recording the number and percentage of fast and slow DARs for each read in the test string and the probability that this percentage will occur. See FIG. 5, steps 13 and 13A. This probability is the standard against which test string probabilities will be measured in FIG. 7, step 25. This probability may be calculated following the same procedure as the calculation of probability for test string data described in FIG. 7, step 24.

The calibrated test strings may then be stored in a test string file for later use in testing the disk (step 14). Preferably, the test string file contains a maximum of between 50 and 100 calibrated test strings to allow for ready replacement if one of the test strings becomes defective due to sector relocation or some other disqualifying condition. Of course, the number of test strings contained in the test string file may vary as conditions warrant.

Testing

Figure 6:
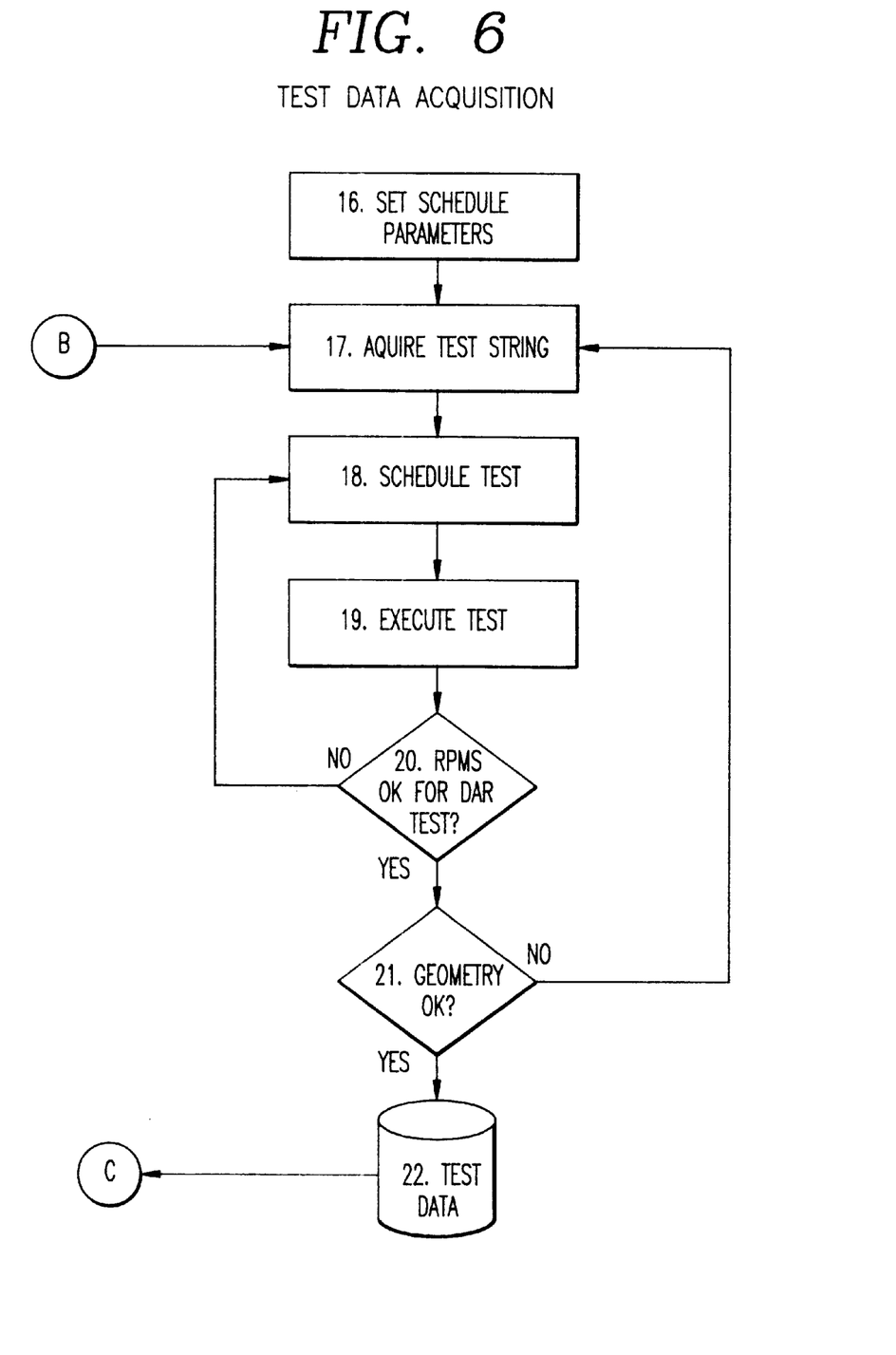
FIG. 6 is a flow chart showing execution of a disk testing procedure in accordance with the invention.
Figure 7:
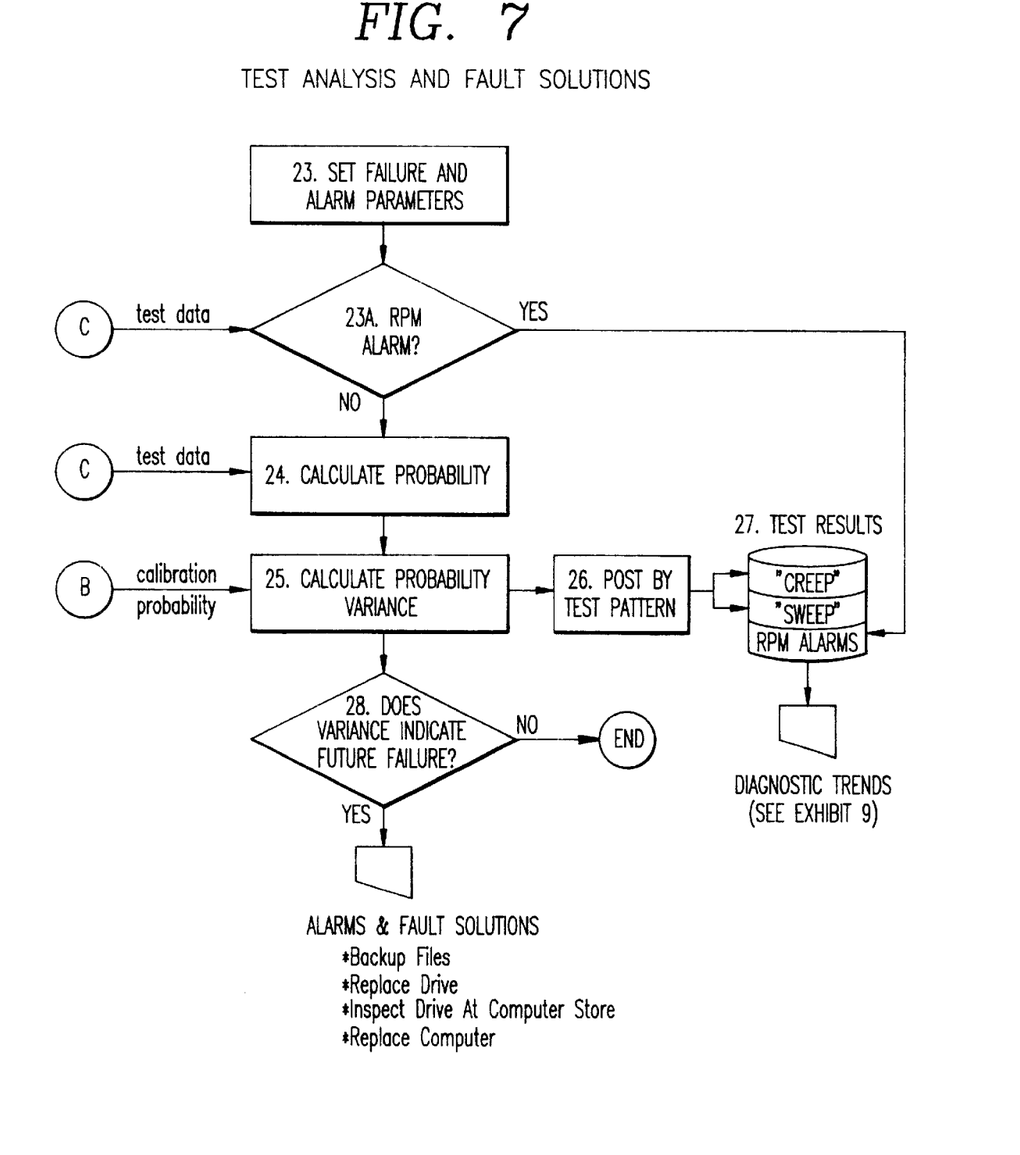
FIG. 7 is a flow chart depicting a predictive failure analysis using data acquired during the testing procedure of FIG. 6.

FIGS. 6 and 7 illustrate the testing procedure. Once the test string is generated, the disk drive may be tested at any time and is preferably tested periodically, e.g., hourly, daily, weekly, etc. The test schedule parameters are set in step 16. Advantageously, normal operations of the computer are not significantly affected during disk testing. The disk test preferably uses only about 10 seconds of disk drive activity time. In accordance with a preferred feature of the invention, the CPU 12 schedules disk tests during periods when the disk is least likely to be accessed. Therefore, the test may be executed during the night hours when computer usage is often minimal. In addition, the test is preferably repeated a plurality of times within a prescribed time period. The frequency of repetition will depend on a number of factors and it may be adjusted as desired. For example, in particularly preferred embodiments, the test may be performed as frequently as every 24 minutes during an 8–10 hour period.

Each test preferably executes the test string a plurality of times. In preferred embodiments, the test string is executed about 10 times during each test. Positioning times for each DAR (sweep or creep) in the test string are preferably measured by CPU 12 and stored in a test data file. These positioning times may be further separated into fast and slow sweeps and creeps.

During each read operation, the spindle speed is monitored as previously described in connection with the calibration procedure. CPU 12 then checks the spindle speed for each of the test string reads. If the spindle speed is outside of an acceptable range of the normal spindle speed (step 19) then a new test is executed. Otherwise, the positioning times for the fast and slow DARs of the test string stored during the calibration procedure (calibrated positioning times) and compared with the positioning times for the fast and slow DARs measured during execution of the test string (measured positioning times) (step 20). If the measured positioning times and the calibrated positioning times regularly differ by 10% or more, then it is believed that the geometry of the disk has changed since calibration due to the physical relocation of one or more sectors on the disk as a result of poor magnetics and other defects . Accordingly, a new test string should be acquired and the test should be executed again using the new test string. If the measured positioning times do not deviate from the calibrated positioning times by more than ±10%, then predictive failure analysis may be performed.

FIG. 7 depicts a process for performing predictive failure analysis. In a preferred procedure, CPU 12 calculates a probability of occurrence of a given distribution of fast and slow DARs which are indicative of the positioning performance of FIG. 2. This parameter is referred to herein as test data probability. The test data probability is preferably calculated using the binomial distribution formula also known as the Bernoulli trial described above. CPU 12 also determines the distribution or ratio of fast to slow DARs executed during the test procedure using the measured positioning times. This parameter is referred to as the DAR ratio. A DAR ratio is calculated for both creeps and sweeps. In step 25, the probability variance is calculated. This parameter refers to the difference between the no-fault calibration and the DAR ratio. For each read operation, the probability variance is stored in a test file, steps 26 and 27.

FIG. 8 depicts a graph showing an exemplary no-fault calibration for sweeps vs. a sweep DAR ratio. In keeping with a preferred aspect of the invention, in step 28 of FIG. 7, CPU 12 compares the sweep DAR ratio with the measured probability in forecasting disk failure. As indicated in FIG. 8, a sweep DAR ratio of 90% fast DARs and 10% slow DARs approximately yields a 3% probability. This indicates that a mechanical fault is present and the drive should be replaced. In contrast, a sweep DAR ratio of 70% fast DARs and 30% slow DARs yields a 20% probability which indicates that the drive does not need to be replaced. Although not shown, CPU 12 also compares the creep DAR ratio with the creep no-fault calibration. In accordance with the invention, when the creep or sweep DAR ratio yields a no-fault calibration below, e.g., 10%, warning signals may be generated to indicate that the disk drive is near failure. More particularly, when the no-fault calibration reaches a first level, e.g., 8%, a first warning signal is preferably generated to indicate that the disk is damaged and that it will soon need replacement. When the no-fault calibration reaches a second level, e.g., 4%, a second warning signal is preferably generated that indicates that the drive should be replaced. A third warning signal is preferably generated when the probability reaches a third level, e.g., 1%. This warning signal indicates that the drive can no longer reliably operate.

In an alternate embodiment, predictive failure analysis may be performed by comparing calibrated positioning times to measured positioning times. This allows for more detailed warning signals to be generated. For example, by comparing calibrated positioning times for sweeps to the measured sweep positioning times, predictive information relating to internal environmental conditions such as contamination, excess moisture, high temperature, vibration, low pressure etc. may be generated. Correspondingly, by comparing calibrated positioning times for creeps to measured creep positioning times, predictive information relating to disk failure caused by mechanical malfunction of component disk drive assembly 10 may be generated.

Figure 9:
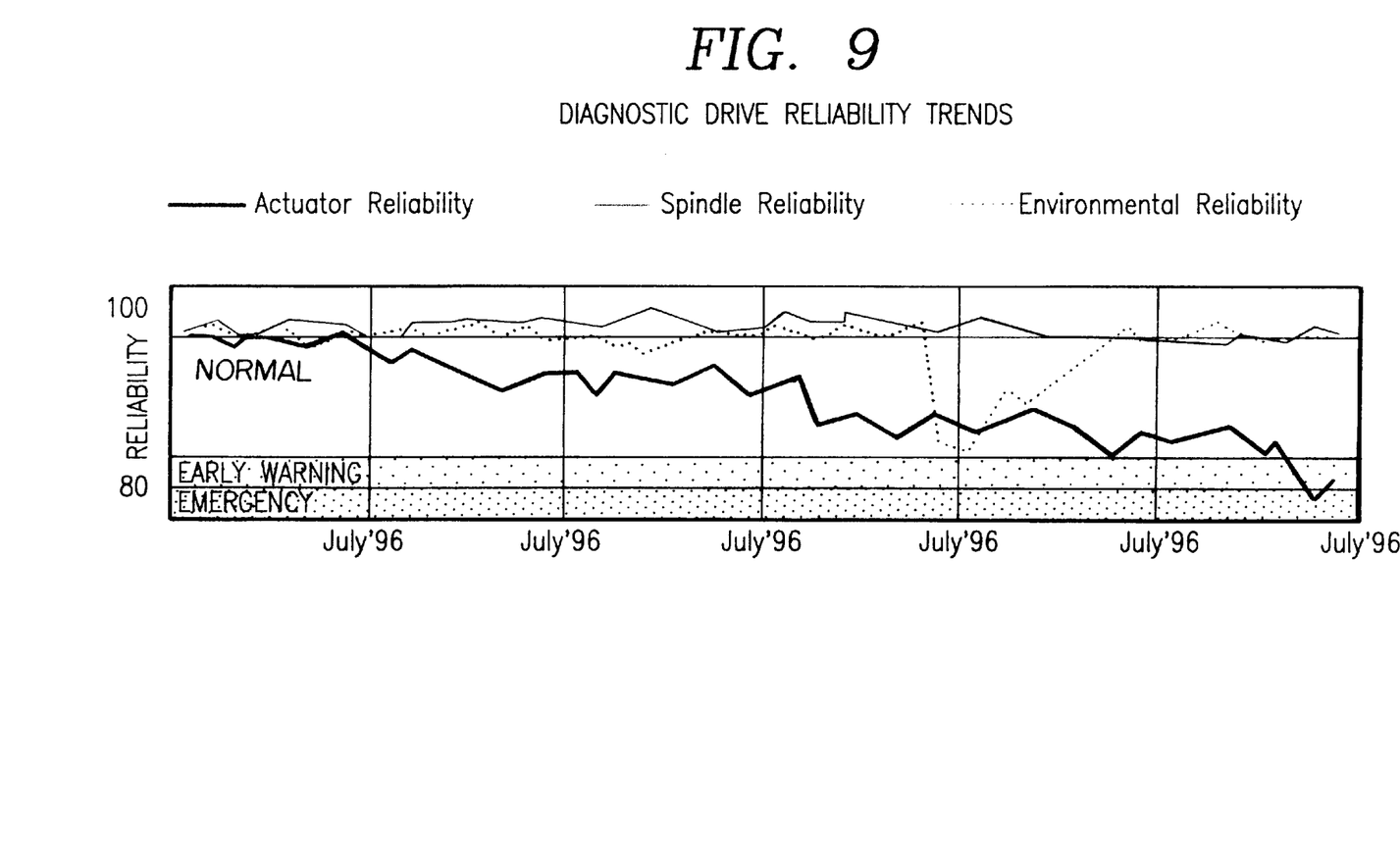
FIG. 9 is a diagram showing the deviation of sweep positioning time, creep positioning time and spindle speed from respective calibration standards over time.

FIG. 9 depicts a graph illustrating disk drive reliability over time in three phases as stored in the test file. Phase one is the reliability of the actuator arm 2, designated in FIG. 9 by the bold solid black line. Phase 2 represents the reliability of the spindle 5 designated by the unbolded solid black line. Phase 3 represents the reliability of the disk based upon its internal environmental conditions designated by the perforated line. Reliability is determined by the degree to which the actual DAR ratios deviate from the calibrated DAR ratios and the degree to which the actual spindle speed deviates from the calibrated spindle speed. As illustrated, as reliability for each of the three phases approaches the 85% range, early warning signals are preferably generated. Such warning signals may include instructions to back up files to a separate storage medium or to inspect the drive for defects. As reliability declines into the 80% range, emergency warning signals. Such warning signals may include instructions to replace the drive, or in severe cases, to replace the entire computer.

For ease of analysis, the chart of FIG. 9 may also be displayed as a composite trend line with the three trend lines combined.

A particularly preferred aspect of the invention is that each warning signal maybe automatically dispatched directly to the user, to authorized computer repair personnel, to the drive manufacturer and/or to any other desired recipient. Such dispatch may occur via a computer network such as the Internet or a private/secure network.

Specific embodiments of the invention may be particularly useful to service organizations to provide services to individual computers on a network such as the Internet or a local area network. Service organizations include large operators of computers providing services to their constituents, commercial service organizations such as providers of computer maintenance services, warrantors of computer viability, and providers of computer hardware and software. In one such embodiment, a computer center generates the individual failure probability analyses based upon disk drive test data provided to it over the network. The computer center down loads a small software package which is automatically installed in the served computer population for the purpose of collecting operational data and transmitting it to the central computer. Included in the down load are calibrated read test strings for the type of disk drives to be monitored. A calibration is conducted for each type of disk drive and includes spare read test strings which are stored at the central computer and used to replace read test strings in the served computer that have become obsolete. The central computer tracks the reliability of the disk drive for each shift and generates a reliability trend chart showing the lifetime reliability of the disk drive as it pertains to the spindle 5, the actuator arm 2 drive and to the environment in which they operate, FIG. 9. A composite of these three reliability trends may also be displayed. When the reliability drops below a predetermined level the central computer is notified with an alarm notice and the user receives a trouble/solution notice explaining the trouble and suggesting solutions.

Figure 3A:
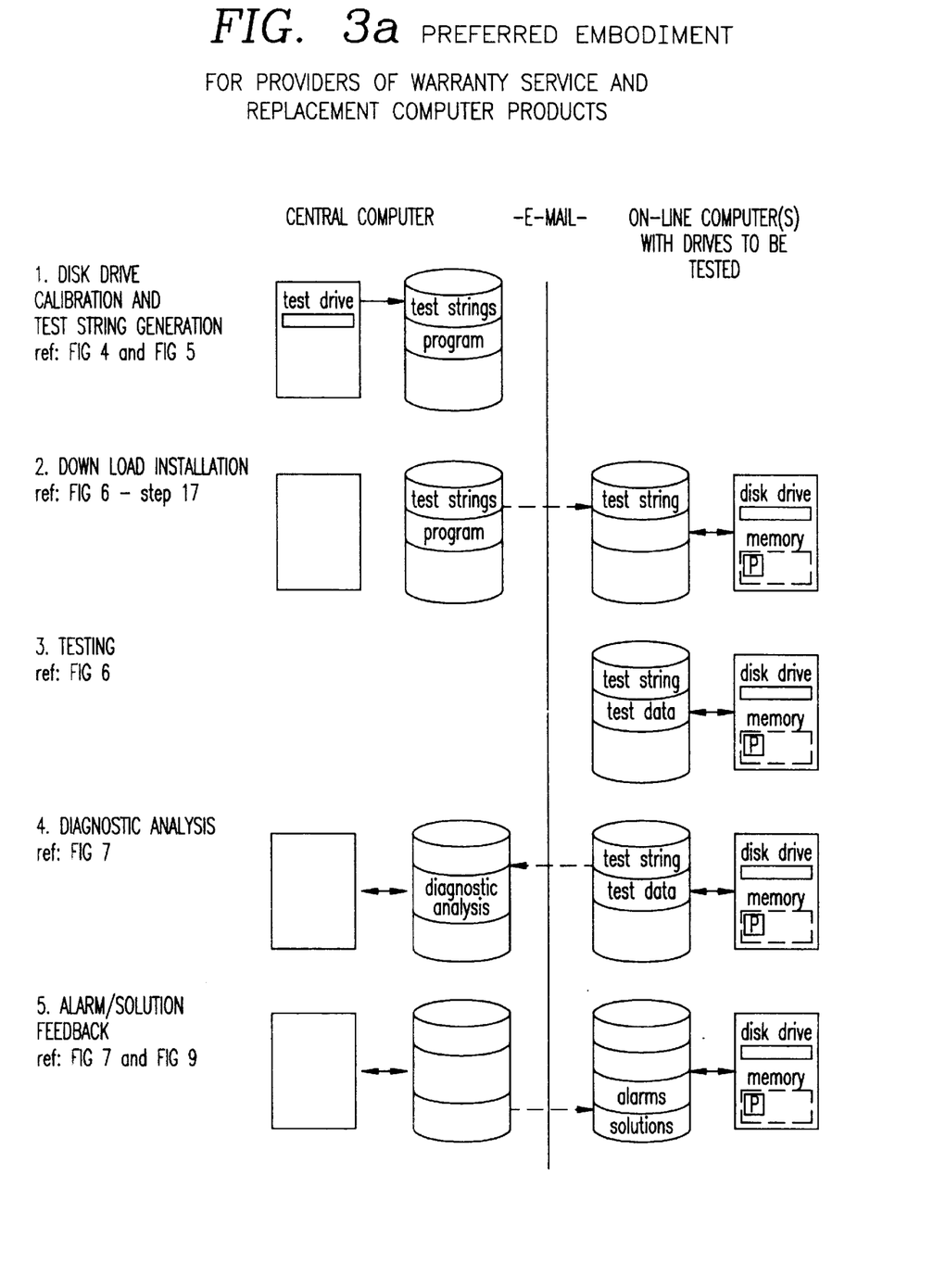
FIG. 3A is a diagram showing the relationship between a central computer and a remote unit under test at various stages of testing.

More particularly, a warrantor, maintainer, manufacturer or user of on-line computers may process, at the computer center, test data collected from on-line computers throughout the network. The calibration of various designs of disk drives may be performed and stored at the computer center, FIG. 3A step 1. A test string and a test data acquisition program may be down loaded and installed on the on-line computer in a process that takes about 10 minutes, step 2. The test data acquisition program is preferably no larger than about 16k. This program regularly collects test data requiring about 200 seconds of disk drive activity time per 8 hours of computers use, step 3. Test data may then be periodically transmitted, e.g., e-mailed, to the central site for diagnosis, step 4. When anomalies are detected and diagnosed alarm notices and the diagnostic drive reliability trend chart (FIG. 9) may be transmitted, e.g., e-mailed, to the computer user along with suggested solutions such as backup up data on the suspect disk and upgrade the reliability of the disk drive, step 5.

Industrial Applicability

The disk failure prediction system of the present invention may be used to analyze disk drives in all types of computers including, but not limited to PC's, and mainframes. Accordingly, the invention is particularly useful for hard disk manufacturers as it allows them to ascertain certain read standards for factory fresh disks which may be compared to data generated by periodically testing the disk to more accurately monitor the useful life of the disk.

Further, the invention is particularly useful for computer manufacturers. Typically, computer manufacturers purchase disks from hard disk manufactures and incorporate the disks into computers that are sold to the users in an assembled state. The invention may be sold directly to the customer at the time of purchase of the computer. Alternatively, the computer manufacturer may use the disk failure prediction system to predict disk failure well before such failure occurs. This provides the computer manufacturer a variety of business advantages including the ability to offer its customers a warranty directed to replacing the disk before failure.

While various embodiments of the present invention have been described, it should be understood that they have been presented by way of example only. Additional modifications and variations of the described embodiments within the scope of the appended claims will be apparent to the skilled artisan.

We claim:

1. A system for predicting failure of a disk drive comprising:
   a disk drive assembly including a spindle, a disk operatively associated with the spindle and a disk reading mechanism including a read head;
   means for providing said disk reading mechanism positioning patterns for reads of data that test reliability of specific functions of hard drive components;
   means for identifying performance sensitive reads in each of the positioning patterns, each performance sensitive read including one of a first read and a second read;
   means for generating a test string including a plurality of performance sensitive reads;
   means for determining a probability of occurrence of a given ratio of performance sensitive reads in the test string and for storing respective probabilities as calibration parameters for the test string;
   means for controlling said disk drive assembly to periodically apply the test string read to the disk;
   means for monitoring the application of the test string to identify a number of a first reads and a number of second reads performed during application of the test string and establishing a ratio of first read to second reads;
   means for comparing the established ratio to respective calibration parameters and for generating a comparison result; and
   means for predicting a possibility of disk failure as a function of the comparison result.

2. The system of claim 1 wherein performance sensitive reads include dual access reads.

3. The system of claim 2 wherein at least one of the positioning patterns includes a read in which the read head traverses a full stroke between an inner diameter and an outer diameter of the disk.

4. The system of claim 2 wherein at least one of the access patterns includes a read in which the read head traverses a small number of tracks.

5. The system of claim 2 wherein the at least one access pattern includes a read in which the read head reads enough different sectors to force the oldest sector out of cache.

6. The system of claim 2 wherein dual access reads include reads which, given a plurality of read repetitions, a percentage of the repetitions require N disk revolutions to complete and the balance of the repetitions require N±1 disk revolutions to complete.

7. The system of claim 1 wherein the test string reads include filler reads interposed between performance sensitive reads.

8. The system of claim 1 further comprising means for measuring positioning times for the performance sensitive reads of the test string and for storing the positioning time for each performance sensitive read as a calibration positioning time.

9. The system of claim 8, further including means for measuring the positioning times for the performance sensitive reads executed during application of the test string and storing the positioning times as measured positioning times.

10. The system of claim 9 further comprising means for comparing measured positioning times to calibration positioning times and for generating a warning signal indicative of disk failure responsive to the comparison.

11. The system of claim 1 wherein said spindle is rotated during reading operations and including means for determining the speed of said spindle during a disk revolution and for comparing the spindle speed to a parameter indicative of a range of acceptable spindle speeds.

12. The system of claim 11 further comprising means for temporarily disabling said means for comparing when said spindle speed lies outside of said range of spindle speeds.

13. The system of claim 12 further comprising means for generating a warning signal indicative of disk failure responsive to the comparison of the spindle speed to the parameter indicative of a range of spindle speeds.

14. The system of claim 1 wherein said disk drive assembly includes a housing encompassing the spindle, the disk and the disk reading mechanism, the housing having first and second sides, a top and a bottom and wherein said means for controlling said disk drive assembly applies the test string to the disk when said disk drive assembly is positioned on one of the first and second sides.

15. An apparatus for predicting failure of a disk drive comprising:
means for generating a test string including a plurality of performance sensitive reads, each performance sensitive read including one of a first and second read;
means for determining a probability of occurrence of a given ratio of first reads to second reads in the test string and for storing respective probabilities as calibration parameters for the test string;
means for periodically applying the test string to a disk;
means for monitoring application of the test string to identify a number of first reads and a number of second reads performed during application of the test string and for establishing a ratio of first reads to second reads;
means for comparing the ratio of first to second reads established by said means for monitoring to respective calibration parameters and for generating a comparison result; and
means for predicting a possibility of disk failure as a function of the comparison result.

16. The apparatus of claim 15 further comprising means for measuring the positioning times for the performance sensitive reads executed during application of the test string as measured positioning times.

17. The apparatus of claim 15 further comprising means for comparing measured positioning times to stored positioning times and for positioning generating a warning signal indicative of disk failure responsive to the comparison.

18. The apparatus of claim 15 further comprising means for detecting the spindle speed for each performance sensitive read in the test string and storing the spindle speeds as calibrated spindle speeds.

19. The apparatus of claim 18 further comprising means for detecting spindle speed for each performance sensitive read executed during application of the test string and storing the detected spindle speeds as measured spindle speeds.

20. The apparatus of claim 19 further comprising means for comparing the measured spindle speeds with the calibrated spindle speeds and for generating a warning signal indicative of disk failure responsive to the comparison.

21. A method for predicting failure of a disk comprising:
providing first and second access patterns for reads of data that are indicative of fault conditions of disks;
identifying performance sensitive reads in each of the access patterns;
generating a test string using the performance sensitive reads of said identifying step, each performance sensitive read including one of a first read and a second read;
determining a probability of occurrence of a given ratio of first reads to second reads in the test string and for storing respective probabilities as calibration parameters for the test string;
periodically applying the test string read to a disk;
monitoring application of the test string to identify a ratio of first reads to second reads performed during application of the test string;
comparing the ratio of first reads to second reads performed during application of the test string to respective calibration parameters and generating a warning signal indicative of probable disk.

22. The method of claim 21 wherein performance sensitive reads include dual access reads.

23. The method of claim 22 wherein at least one of the access patterns includes a read in which the read head traverses a full stroke between an inner diameter and an outer diameter of the disk.

24. The method of claim 22 wherein at least one of the access patterns includes a read in which the read head traverses a small number of tracks.

25. The method of claim 22 wherein the at least one access pattern includes a read in which the read head reads enough different sectors to force the oldest sector out of the cache.

26. The method of claim 22 wherein dual access reads include reads having two possible timings.

27. The method of claim 26 wherein dual access reads include reads which, given a plurality of read repetitions, a percentage of the repetitions require N disk revolutions to complete and the balance of the repetitions require N±1 disk revolutions to complete.

28. The method of claim 22 wherein generating the test string reads includes interposing filler reads between performance sensitive reads.

29. The method of claim 21 further comprising measuring positioning times for the performance sensitive reads of the test string and storing the positioning time for each performance sensitive read as a calibration positioning time.

30. The method of claim 29, further including measuring the positioning times for the performance sensitive reads executed during application of the test string as measured positioning times.

31. The method of claim 30 further comprising comparing measured positioning times to stored positioning times and generating a warning signal indicative of disk failure responsive to the comparison.

32. The method of claim 21 further comprising rotating said spindle during reading operations and determining the speed of said spindle during a disk revolution and comparing the spindle speed to a parameter indicative of a range of acceptable spindle speeds.

33. The method of claim 32 further comprising temporarily halting the comparison of claim 31 when said spindle speed lies outside of said range of spindle speeds.

34. The method of claim 32 further comprising generating a warning signal indicative of disk failure responsive to the comparison of the spindle speed to the parameter indicative of a range of acceptable spindle speeds.

35. The method of claim 21 wherein the disk is enclosed by a housing having a top, a bottom and a pair of opposing sides, the method further including tilting the housing onto one of the opposing sides prior to application of the test string.

36. A method for generating a disk drive failure indicator comprising:

provliding access patterns for reads of data that are indicative of fault conditions of disks;

identifying performance sensitive reads in each of the access patterns, each performance sensitive read including one of a first read and a second read;

generating a test string including the performance sensitive reads of said identifying step; and determining a probability of occurrence of a given ratio of first reads to second reads in the test string and storing respective probabilities as calibration parameters for the test string.

37. The method of claim 36 further comprising measuring the positioning times for the performance sensitive reads executed during application of the test string and storing the positioning times as measured positioning times.

38. The method of claim 36 further comprising comparing measured positioning times to stored positioning times and for generating a warning signal indicative of disk failure responsive to the comparison.

39. The method of claim 36 further comprising detecting the spindle speed for each performance sensitive read in the test string and storing the spindle speeds as calibrated spindle speeds.

40. The method of claim 36 further comprising detecting spindle speed for each performance sensitive read executed during application of the test string and storing the detected spindle speeds as measured spindle speeds.

41. The method of claim 40 further comprising comparing the measured spindle speeds with the calibrated spindle speeds and for generating a warning signal indicative of disk failure responsive to the comparison.

42. A method for predicting failure of a disk drive comprising:

periodically applying a test string read to a disk, the test string read including a plurality of performance sensitive reads;

monitoring the application of the test string to identify a ratio of first to second reads from amongst the plurality of performance sensitive reads performed during application of the test string;

comparing the ratio of first to second reads to respective calibration parameters for the test string and generating a warning signal indicative of possible disk failure responsive to said comparison.

43. The method of claim 42 wherein the calibration parameter includes a probability of occurrence of a given ratio of first and second reads.

44. The method of claim 42 wherein the first and second performance sensitive reads include respective first and second access patterns.

45. The method of claim 44 wherein the comparing step includes comparing the first and second performance sensitive reads corresponding to the first access pattern with a first calibration parameter and comparing the first and second performance sensitive reads corresponding to the second access pattern to a second calibration parameter.

46. The method of claim 44 further comprising measuring positioning times for the first and second reads corresponding to the first access pattern and storing the positioning times as first positioning times and measuring positioning times for the first and second reads corresponding to the second access pattern and storing the positioning times as second positioning times.

47. The method of claim 46 further comprising comparing the first and second positioning times to respective first and second calibrated positioning times and generating a warning signal indicative of probable disk failure responsive to the comparison.

48. The method of claim 42 wherein the disk is enclosed by a housing having a top, a bottom and a pair of opposing sides, the method further including tilting the housing onto one of the opposing sides prior to application of the test string.

49. An apparatus for generating a disk drive failure indicator comprising:

means for generating access patterns for reads of data that test reliability of specific functions of disk components;

means for identifying performance sensitive reads in each of the access patterns, each performance sensitive read including one of first and second reads;

means for generating a test string including a plurality of the firs and second reads, the test string, when applied to a disk, being an indicator of possible disk failure.

50. The apparatus of claim 49 wherein each performance sensitive read includes reads which, given a plurality of read repetitions, a percentage of the repetitions require N disk revolutions to complete and the balance of the repetitions require N±1 disk revolutions to complete.

51. An apparatus for predicting failure of a disk drive comprising:

means for periodically applying a test string read to a disk, the test string including a plurality of performance sensitive reads, each performance sensitive read including one of a first read and a second read;

means for monitoring the application of the test string to identify a ratio of first to second reads performed during application of the test string;

means for comparing the ratio of first to second reads to respective calibration parameters and for generating a comparison result; and means for predicting a possibility of disk failure as a function of the comparison result.

* * * * *

UNITED STATES PATENT AND TRADEMARK OFFICE
CERTIFICATE OF CORRECTION

PATENT NO.    : 6,249,887 B1
DATED         : June 19, 2001
INVENTOR(S)   : Gray et al.

It is certified that error appears in the above-identified patent and that said Letters Patent is hereby corrected as shown below:

<u>Title page,</u>
Item [73], Assignee, should read -- William F. Gray, Melbourne Beach, FL. --.

Signed and Sealed this

Eighteenth Day of November, 2003

JAMES E. ROGAN
*Director of the United States Patent and Trademark Office*